(12) United States Patent
Khan

(10) Patent No.: US 11,216,766 B2
(45) Date of Patent: Jan. 4, 2022

(54) SYSTEM AND METHOD FOR GENERALIZED SKILL ASSESSMENT USING ACTIVITY DATA

(71) Applicant: KABUSHIKI KAISHA TOSHIBA, Tokyo (JP)

(72) Inventor: Aftab Khan, Bristol (GB)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 609 days.

(21) Appl. No.: 15/401,521

(22) Filed: Jan. 9, 2017

(65) Prior Publication Data

US 2018/0197078 A1 Jul. 12, 2018

(51) Int. Cl.
*G06N 20/00* (2019.01)
*G06Q 10/06* (2012.01)

(52) U.S. Cl.
CPC ......... *G06Q 10/0639* (2013.01); *G06N 20/00* (2019.01)

(58) Field of Classification Search
CPC ........................... G06N 20/00; G06Q 10/0639
See application file for complete search history.

(56) References Cited

U.S. PATENT DOCUMENTS

| 9,526,430 | B2 * | 12/2016 | Srinivas | ............... | A61B 5/7221 |
| 10,535,015 | B2 * | 1/2020 | Ahn | ........................ | G06N 7/005 |
| 2007/0134636 | A1 | 6/2007 | Chan et al. | | |
| 2010/0209892 | A1 * | 8/2010 | Lin | ......................... | G09B 9/05 434/71 |
| 2016/0314818 | A1 | 10/2016 | Kirk et al. | | |
| 2017/0061817 | A1 * | 3/2017 | Mettler May | ........ | G09B 19/003 |
| 2017/0193395 | A1 * | 7/2017 | Limonad | ................ | G06N 20/00 |

FOREIGN PATENT DOCUMENTS

JP 2016-208516 A 12/2016

OTHER PUBLICATIONS

Moeller et al., "GymSkill: A Personal Trainer for Physical Exercises," in 2012 IEEE Intl. Conf. on Pervasive Computing and Comms. 213-220 (2012). (Year: 2012).*
Baechlin et al., "SwimMaster: A Wearable Assistant for Swimmer," in Proceedings of the 11th Intl. Conf. on Ubiquitous Computing 215-224 (2009). (Year: 2009).*
Ladha et al., "ClimbAX: Skill Assessment for Climbing Enthusiasts," in Proceedings of the 2013 ACM Int'l. Joint Conf. on Pervasive and Ubiquitous Computing 235-244 (2013). (Year: 2013).*

(Continued)

*Primary Examiner* — Kamran Afshar
*Assistant Examiner* — Ryan C Vaughn
(74) *Attorney, Agent, or Firm* — Finnegan, Henderson, Farabow, Garrett & Dunner L.L.P.

(57) ABSTRACT

According to an embodiment there is provided a method of skill classification comprising receiving data indicative of an activity performed by a person, classifying the type or types of activity performed by the person based on the received data, wherein classifying provides an indication of an activity type or activity types as well as an indication of the confidence that an activity has been classified correctly and classifying a skill level associated with a classified activity or classified activities on the basis of the indication of confidence.

12 Claims, 5 Drawing Sheets

(56) References Cited

OTHER PUBLICATIONS

Khan et al., "Beyond Activity Recognition: Skill Assessment from Accelerometer Data," in Proc. 2015 ACM Intl. Joint Conf. Pervasive and Ubiquitous Computing 1155-66 (2015). (Year: 2015).*

Khan et al., "Beyond Activity Recognition: Skill Assessment from Accelerometer Data," Proc. Int. Conf. Ubiquitous Computing (UBICOMP '15), pp. 1155-1166 (Sep. 2015).

Berlin et al., "Detecting Leisure Activities with Dense Motif Discovery," Proc. Int. Conf. Ubiquitous Computing (2012), pp. 1-10.

Khan et al., "Multilevel Chinese Takeaway Process and Label-Based Processes for Rule Induction in the Context of Automated Sports Video Annotation," IEEE Transactions on Cybernetics (2014),44:1910-23.

Casale et al., "Personalization and user verification in wearable systems using biometric waling patterns," Pers. Ubiquit. Comput. (2012), 16:563-580.

Bulling et al., "A Tutorial on Human Activity Recognition Using Body-Worn Inertial Sensors," ACM Computing Surveys. (2014), 46:33:1-33:33.

* cited by examiner

SYSTEM AND METHOD FOR GENERALIZED SKILL ASSESSMENT USING ACTIVITY DATA

FIELD

Embodiments described herein relate generally to a method and device for skill assessment. Embodiments particularly relate to a computationally inexpensive skill assessment method and a device implementing this method.

BACKGROUND

Some human activity recognition (HAR) systems aim at determining activities of interest using multimodal sensing devices. The majority of these systems focus on automatically recognizing the type of activities and associating spatio-temporal tags with them, without, however, assessing the quality of the detected activity. These known techniques therefore fail to assess the skill involved in performing the detected activity.

Automated skill assessment using a hierarchical analysis framework are known. Such methods can rely on complex relationships between representations that contain implicit information useful for skill assessment.

Domain specific skill assessment methods are also known for various sports (climbing, basketball, baseball, etc.) and healthcare technologies (surgical skills, Parkinson's etc.). Domain specific frameworks are usually only applicable in the domain they were originally designed for.

In the following, embodiments will be described with reference to the drawings in which.

Figure 5:
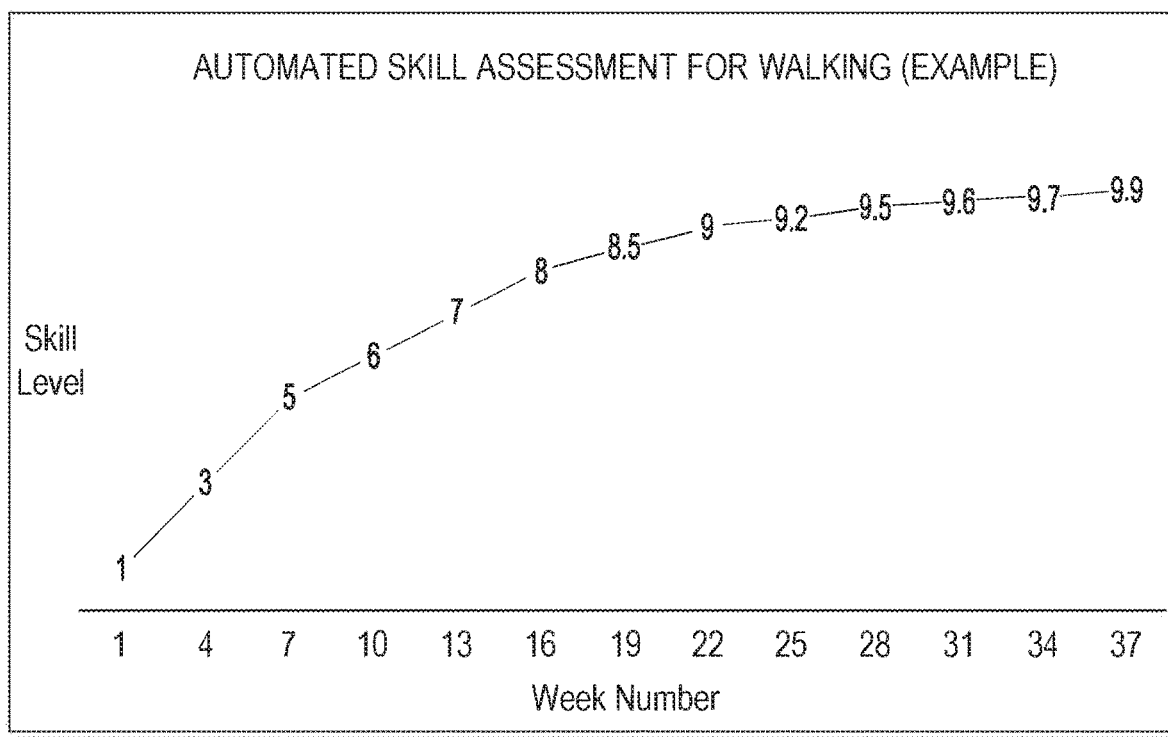
Figure 6:
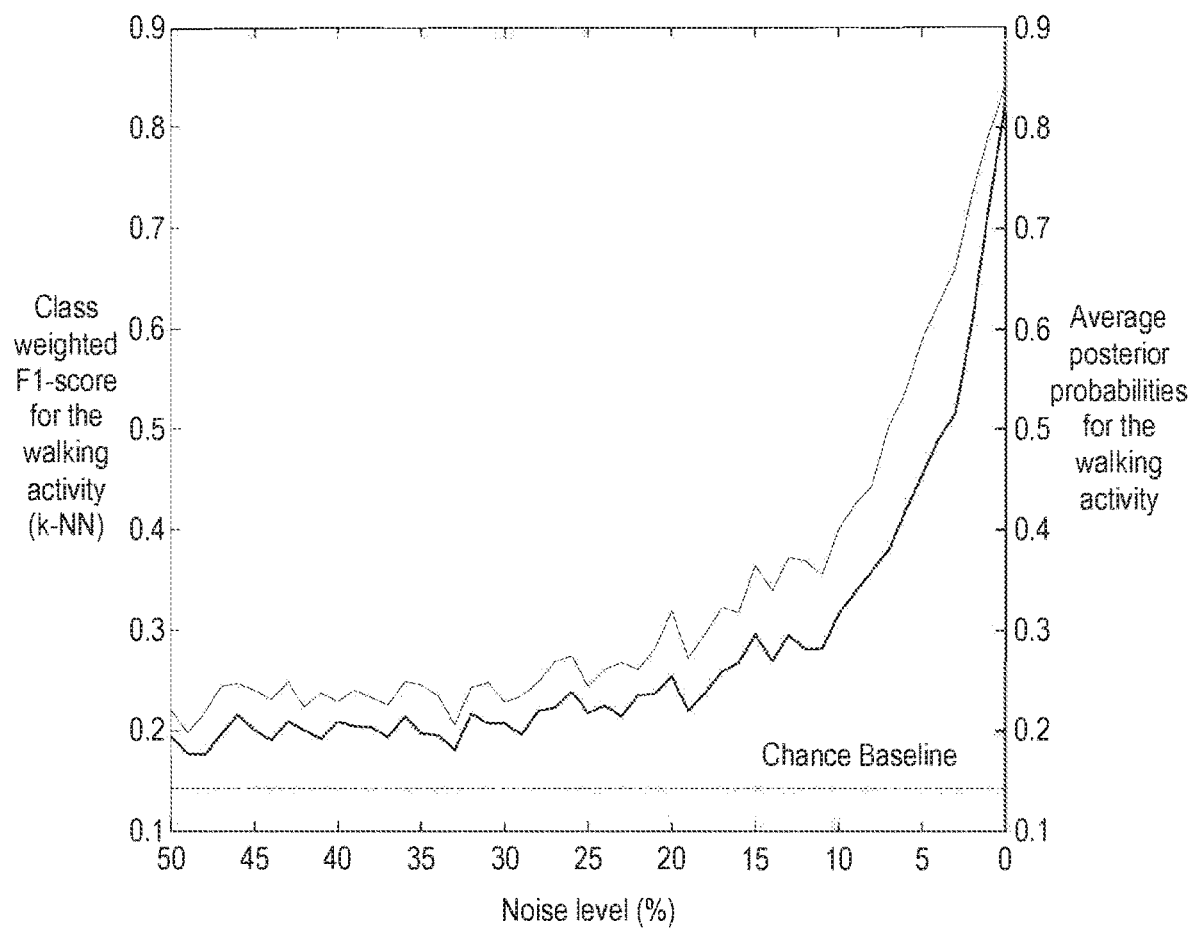
Figure 7:
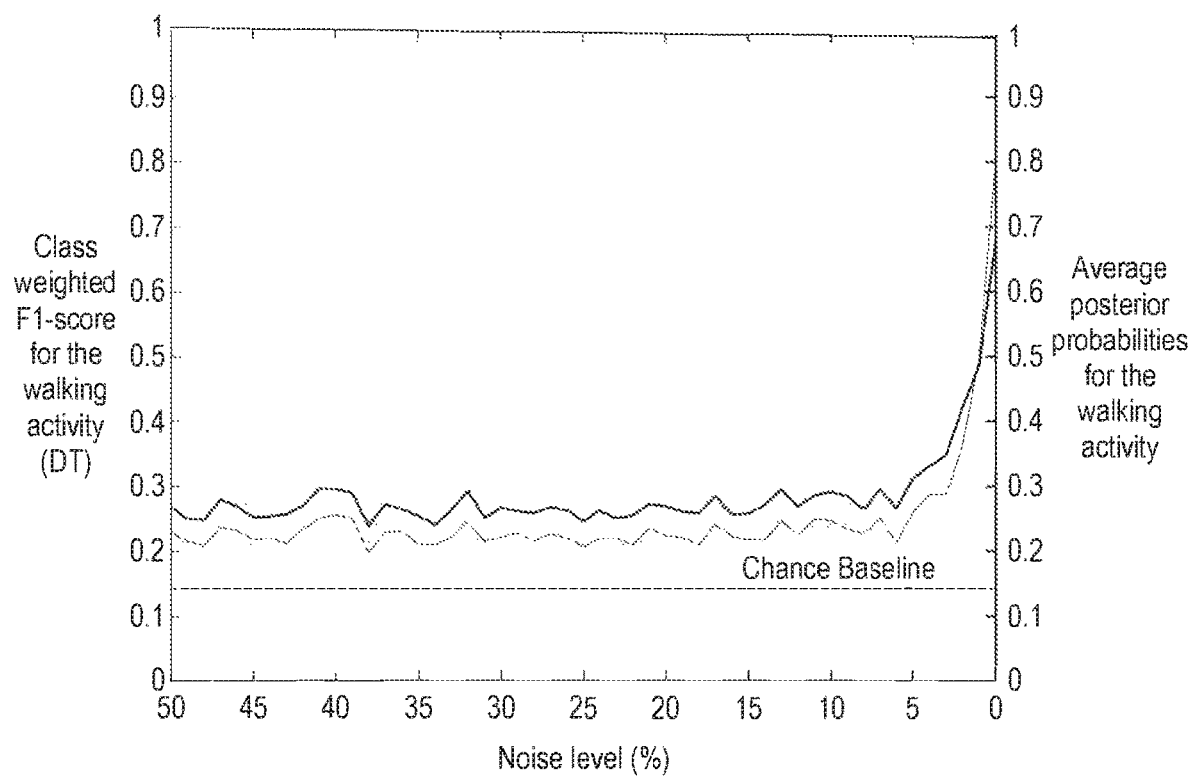

FIG. 5 visualizes an example of the results of skill tracking/trending over time;

FIG. 6 shows a class-weighted F1-score for the walking activity using a k-NN classifier. Posterior probabilities are also shown with respect to decreasing noise levels (simulating improvement in skill);

FIG. 7 shows a class-weighted F1-score for the walking activity using a Decision Tree classifier.

DETAILED DESCRIPTION

According to an embodiment there is provided a method of skill classification comprising receiving data indicative of an activity performed by a person, classifying the type or types of activity performed by the person based on the received data, wherein said classifying provides an indication of an activity type or activity types as well as an indication of the confidence that an activity has been classified correctly and classifying a skill level associated with a classified activity or classified activities on the basis of the indication of confidence.

Either or both of the two classification steps rely on machine learning models to classify the type of activity. By relying on confidence measures the skill assessment model can be kept flat, resulting in feature vectors that are smaller than those used in known skill assessment methods, rendering the method of the embodiment less computationally intensive, facilitating real-time operation and/or a reduction in power consumption. The method of the embodiment can therefore be limited so that the only classification steps performed are the two abovementioned classification steps. Some feature extraction steps providing input to the respective classification steps may also be performed.

The method may moreover output a determined skill level to provide feedback to an individual performing the classified task or to a supervisor. The output may additionally provide the assessed skill level for storage as part of a time series of assessed skill levels. The method in one embodiment comprises the step of storing the assessed skill level or a plurality or time series of assessed skill levels.

Discriminative classifiers may be used to classify the activity of the person. A discriminative classifier used may be one or more of a k-NN (k-Nearest Neighbours), DT (Decision Tree), and SVM (Support Vector Machine) classifier. These classifiers may be used in one or both of the above mentioned classification steps.

The method may further comprise extracting features from the received data using a sliding window or extracting features from the received data after unsupervised symbolic representation of the data.

The method may further include determining if contextual activity data are available and, should this not be the case, using unsupervised symbolic representations for skill assessment.

The method may further comprise extracting features from classified activity data prior to classifying the skill level, wherein extracting features form the classified activity data comprises using the indication of confidence as an input.

The skill level may be classified using a Naïve Bayes classifier, a Gaussian classifier or a neural network.

Predetermined expert input may be used for training a model used for classifying said skill level.

Domain independence can be achieved by the method as the method's architecture does not have to take any movement or skill specific features into account. Put in other words, the steps performed by the method remain the same, irrespective of which skill domain/tasks the method is applied to. It is only in the step of the skill classification method that a model trained using skill labels provided by domain experts is used. This does, however, not change the fact that the architecture of the method and the flow of method steps is not dependent on the skill domain.

According to another embodiment there is provided a device comprising an input for receiving activity data of a person, a processor and a memory storing program code, the program code configured to cause the processor, when executed by the processor, to receive data indicative of an activity performed by a person, to classify the type or types of activity performed by the person based on the received data, wherein said classifying provides an indication of an activity type or activity types as well as an indication of the confidence that an activity has been classified correctly and to classify a skill level associated with a classified activity or classified activities on the basis of the indication of confidence.

The device may be a smart phone, a wearable smart wristband, a watch and/or may be integrated in an item of clothing for wear.

The device may further comprise an output for indicating a result of the skill classification to a user.

The device may further comprise a means of aggregating skill classifications and for outputting an indication of change in the classified skill level.

According to another embodiment there may be provided a non-volatile storage medium comprising computer program code that, when executed by a processor, causes the processor to perform any of the aforementioned methods.

Quality or skill assessment is a complicated task and may be performed in a specific domain, for example a domain that focusses on a particular movement or series or set of movements. Similarly, skill assessment may be performed by assessing certain sets of associated metrics that are indicative of the skill to be assessed. For example, for some sports stamina, strength and power could be considered as important metrics for determining skill whilst for others the amount of activity and speed could be more indicative of skill.

The method relies on a statistical classification mechanism with no domain related restrictions. Generalized skill classification is performed using the posterior probabilities of a low-level statistical classifier that highlights the confidence in classifying activities. Feature extraction is performed using these confidence scores for classifying skill. Since the method is independent from both the skill domain and the underlying recognition methods and relies only on the activity data, it can easily be generalized.

Figure 1:
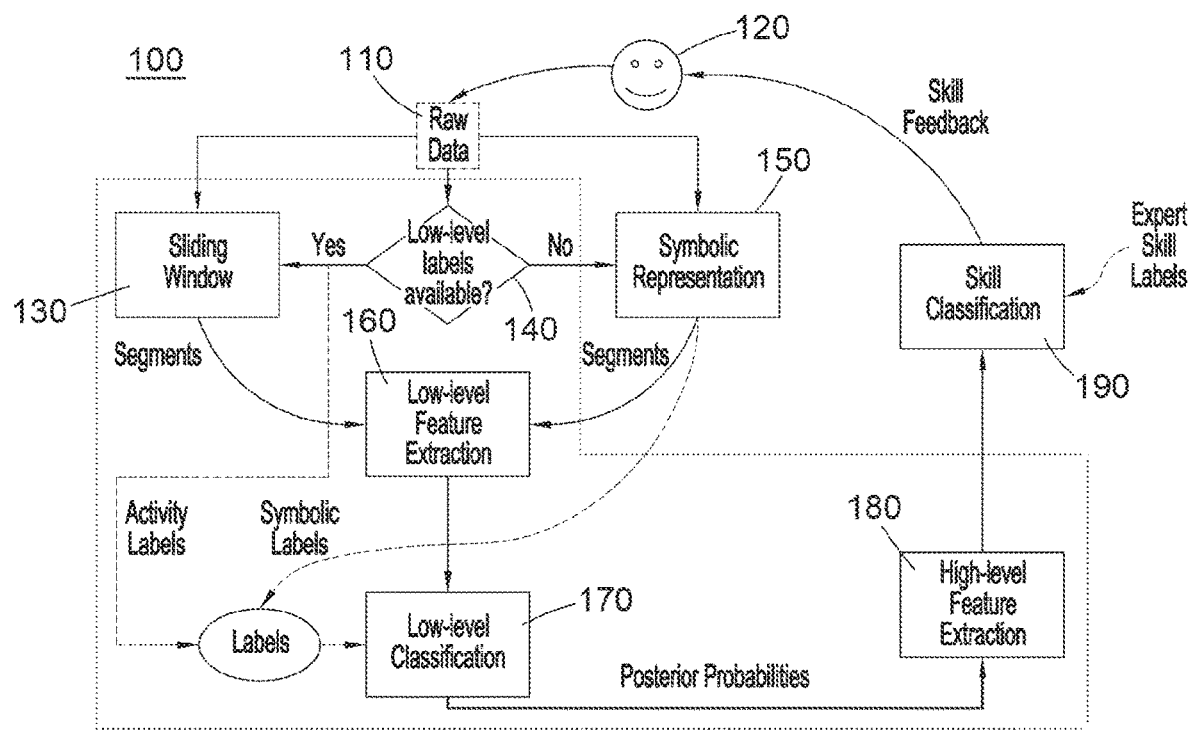
FIG. 1 shows a skill assessment method of an embodiment.

FIG. 1 shows a skill assessment method 100 according to an embodiment. The raw data upon which the embodiment operates may have been captured in step 110 using inertial measurement units (IMUs), particularly by a three-axis accelerometer that measures acceleration in 3 dimensions, carried by a user 120. Alternative measurement units that operate using different sensing principles can, however, be used instead. These can also include gyroscopes and magnetometers that can be worn on-body as well as PIR (Passive infrared) sensors placed at a distance from the body similar to a camera to track movements.

The acquired raw data are analysed by segmenting the data into a series of adjacent or overlapping windows in step 130 and by applying known data processing methods in step 160 to the windowed data to extract features from the data. Low-level data labels are predetermined characteristics of short sections of data that do not rely on the output of a previous classification step for their generating. The data processing methods applied to the data in each sliding window can include determining one or more or all of:

in the time domain:
the mean of the data in each sliding window,
the median, maximum, minimum and/or range of the data in each sliding window,
the variance of the data in each sliding window,
the standard deviation of the data in each sliding window,
the rms of the data in each sliding window,
the correlation between data in different sliding windows and/or along different axes,
the cross-correlation between different sliding windows and/or along different axes,
an integral or double integral of the data in each sliding window, in particular of accelerometer data,
a difference between signals arranged in pairs,
the points at which the data crosses the half-way point of its own range, e.g. within a window,
the angle and angular velocity of an accelerometer relative to gravitational pull,
the sum of the area encompassed by the magnitude of each of the three-axis accelerometer signals,
the Signal Vector Magnitude (SVM) and/or the Differential Signal Vector Magnitude (DSVM),
the energy and entropy of the magnitude of the acceleration vector measured for the three axes, in the frequency domain (arrived at through a Wavelet, Fourier or other time to frequency domain transform):
the coefficients sum of Wavelet or Fourier transformations,
the DC component of a signal,
the dominant frequency in a Fourier transformation,
the empirical cumulative distribution function (ECDF),
the spectral energy of a signal, computed by determining the squared sum of the signals' spectral coefficient,
the normalized information entropy of the discrete FFT coefficient magnitudes excluding the DC component, and
the summation of a set of spectral coefficients.

Low level activities may be readily associated with low-level labels. Some easily characterisable activities (say, for example, walking, lifting a limb, etc.) can consequently be labelled with such low-level labels, if these have been defined a priori. Should it be determined in step 140 that no relevant previously defined labels are available and that the raw data allows the association of the labels with the data then, in an embodiment, the data may alternatively first be converted into symbolic representations in step 150. The method described in Berlin, E., and Van Laerhoven, K. (2012), "Detecting leisure activities with dense motif discovery", In Proc. Int. Conf. Ubiquitous Computing (UbiComp) can be used for this purpose. In this process the data are discretised to form a series of symbols with each symbol reflecting a particular feature of the original data. Such symbolic representations may also contain explicit segment boundaries which are used for feature extraction. Depending on the complexity of a domain, in one embodiment vocabulary size of these symbols can be varied. Simple statistical methods, such as the methods and criteria mentioned above combined with symbolic or activity labels, are then used to perform recognition operations on these segments, wherein a segment can either correspond to the size of the window or the length of the symbol, whichever is appropriate.

Irrespective of whether the data are segmented using windowing as in step 130 or first converted into a symbolic representation in step 150 features associated with the data are extracted in step 160 using one or more of the above mentioned methods. The thus extracted features are used as an input for a first classification step 170. This classification step produces, as its output, an indication of the type of activity represented by the data as well as a confidence score associated with the classification step. Any type of discriminative classifier may be used for this purpose. Particularly suitable are k-NN (k-Nearest Neighbours), DT (Decision Tree), and SVM (Support Vector Machine) classifiers. The output of classification step 170 provides an indication of the activity identified in the classification step as well as a confidence score associated with this classification. The activity classified may be activities comprising a range of individual movements. Some activities, such as walking, may include a large number of movements performed by the user to complete the activity. Other activities, say for example, performing an activity with a single hand or both hands, such as suturing during an operation, may include a smaller number of individual movements.

Having determined the type of activity and the confidence related to activity classification a further feature extraction step 180 is performed to extract features of a time series of the confidence scores of the multiple identified activities or symbols. One or more of the data processing methods mentioned above with reference to the first feature extraction step 160 may also be used in step 180 to extract features from the series of confidence scores provided by the low-level activity classification step 170.

In step 190 standard classification methods are used to classify skill levels based on the extracted high-level features. Particularly suitable are, again, k-NN (k-Nearest Neighbours), DT (Decision Tree), and SVM (Support Vector Machine) classifiers. The classification step 190, in an embodiment, relies on a trained model. To train the model expert skill labels that have been provided to the classification step 190 prior to training are used to aid the correct classification of the skill on the basis of features extracted in step 180 during training runs of the method. Once trained, skills are classified in skill classification step 190 on the basis of the trained model and the high-level features extracted in step 180, without further need for expert labels. Naïve Bayes classifiers, Gaussian classifiers, and neural networks are particularly useful in step 190.

Figure 2:
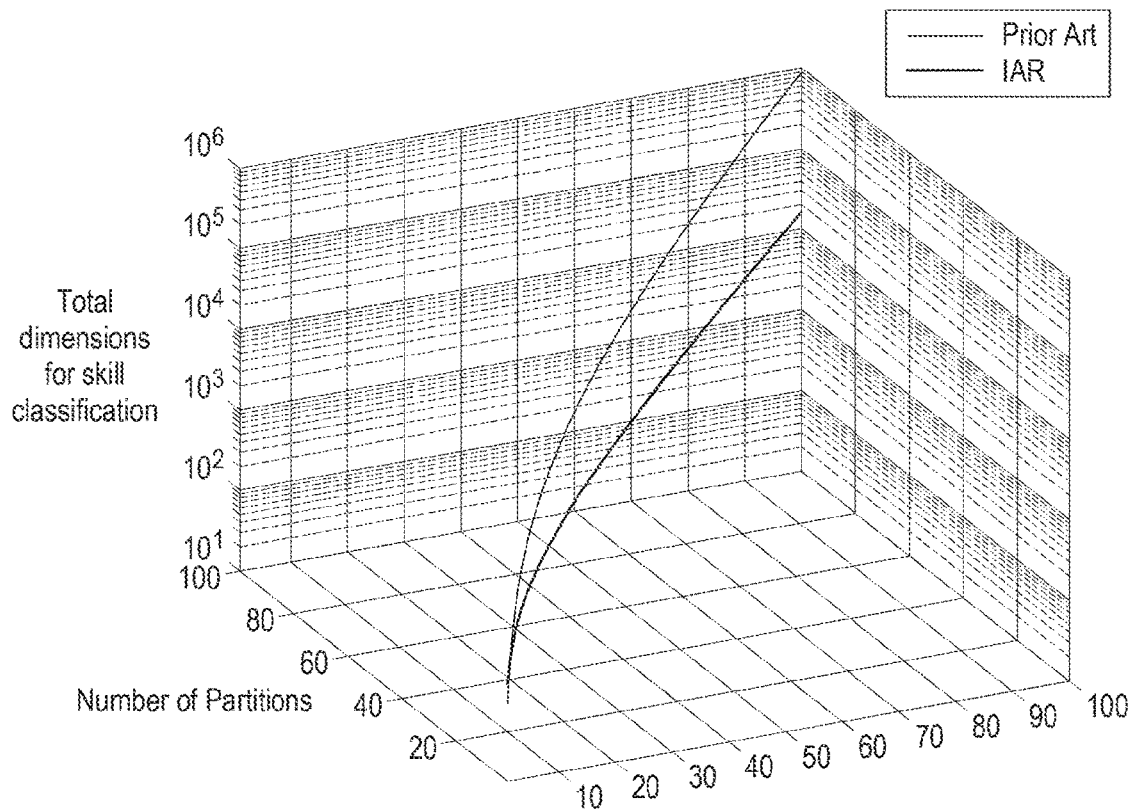
FIG. 2 shows complexity curves represented in the form of total dimensions required for skill classification with respect to the total number of sensors and the number of partitions required to perform skill assessment.

In contrast to known skill assessment methods the method of the embodiment does not require data to be partitioned into a number of (hierarchical) sub-segments. In a known method that comprises data arranged in p partitions comprising features having d dimensions this means that the feature vector has the size p×d. Given that in the embodiment no partitioning is required, the size of the feature vector is reduced. FIG. 2 illustrates the dependence of the total dimensions for skill classification on the number of partitions and the number of sensors. The upper curve relates to a known skill classification method whereas the lower curve relates to the skill classification method of the embodiment, indicating a marked reduction in complexity, allowing near real-time performance in the embodiment. It can be clearly seen that the dependence on partitioning data for skill assessment heavily restricts the real-time application of automated and generalized skill assessment. As the total number of feature dimensions required to perform skill assessment is reduced in the embodiment when compared to known skill assessment methods, it is apparent that the embodiment also utilizes less power for assessing skill.

In the embodiment only the confidence score provided by the low level classification is used in extracting high-level features. Skill is then assessed on the basis of the extracted high-level features. This has to be contrasted with prior art skill classification methods which require learning rule structures and associated probabilistic relationships between various sets of movements in the symbols space. In the embodiment, in contrast, the above described classification procedure is used instead. This process is relatively "flatter", resulting in a faster availability of posterior probabilities which are then utilized as skill metrics for skill assessment. The confidence scores generated when classifying low-level movements results in less complex representation of movement when compared to known skill assessment techniques and emphasises the repeatability aspects of skill (i.e., "the ability to do something well, repeatedly").

As the method of the embodiment is not domain dependent it can be used in wearable devices for a variety of sports including football, rugby, cricket and tennis. Since the embodiment is computationally less expensive than prior art, its usage in real-time is more practical. It can also help players and coaches in tracking performances with respect to skill levels. For example, a player can track and optimise performance with the respect to the training before a given game. Novice players can assess their skill with respect to professional players and improve on aspects necessary for skill development. Injured players can assess their rehabilitation by analysing depleted skill quality and tracking improvement over time.

The embodiment may also be used in monitoring people with physical disabilities and tracking their movements over time for clinicians or caregivers to make relevant decisions. In surgical skills training the embodiment can be utilized in near real-time as opposed to offline to assess complex movements that are indicative of skill quality. Activity improvement or deterioration (walking, running or jumping) can also be assessed for a wide variety of people to assess quality or skill in their activities for symptoms of health related problems.

Figure 3:
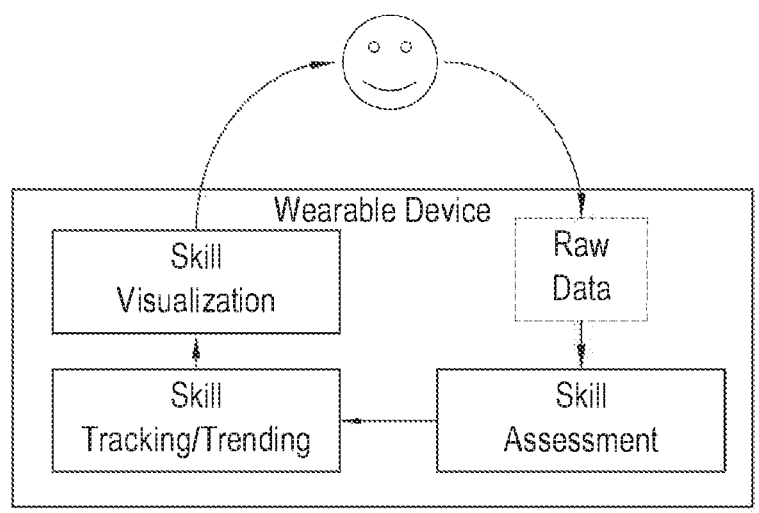
FIG. 3 shows a representation of automated and generalized skill assessment on a wearable device.

Since the method of the embodiment is computationally less expensive than known methods, its deployment on wearable devices is realistic. FIG. 3 shows a representation of a skill assessment module on a wearable device able to track various types of activities on board post activity recognition. The device is worn by a user and comprises sensors for sensing the user's movement. These sensors provide the raw data illustrated in FIG. 3. The device performs skill assessment in the manner described above with reference to FIG. 1 and provides the determined skill level to a skill tracking/trending module. Changes or improvements in skill are communicated to the user via a skill visualisation means.

Figure 4:
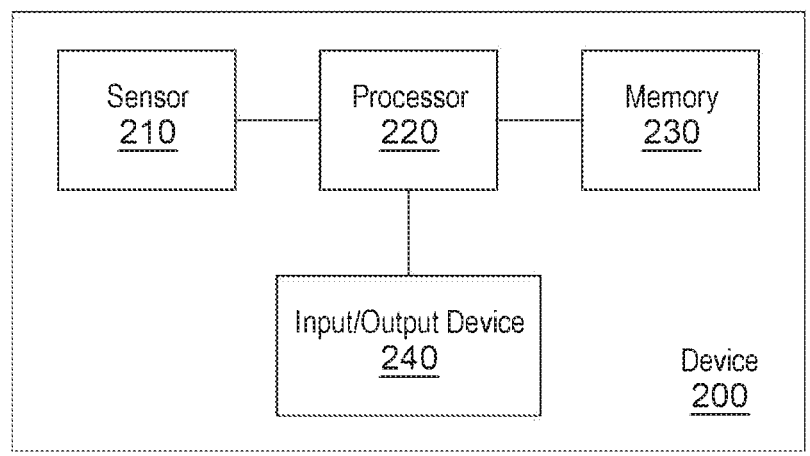
FIG. 4 shows a configuration of a skill assessment device of an embodiment.

FIG. 4 shows a hardware configuration of a skill assessment device 200 according to an embodiment. The device 200 comprises a sensor 210 for acquiring the raw data upon which the method of the embodiment operates. A processor 220 executes program code stored in memory 230, the program code being such that, when executed by the processor 220 the processor implements the method of the embodiment. An input/output device 240 is used for outputting the results of the skill assessment. This may include providing a visual indication of the skill assessment results, an indication that is otherwise perceptible by a user, such as an audible indication, and/or the transmission, preferably wirelessly, of a signal indicative of the assessment result to a further device that may store the result and/or make further use of the assessment result, say in developing a training plan, keeping track of training activity, monitoring the skill performed in a particular (possibly non-training) task, for example to avoid liability claims, etc. It will equally be appreciated that the sensor 210 does not have to be physically present in the device 220. Instead the sensor may transmit the sensed raw data via a connection, preferably a wireless connection, to the device 220 as input for the skill assessment method.

Since the computational requirements demanded by the embodiment are significantly lower than those required by known skill assessment methods, skill assessment can therefore be performed on a platform where power resources are limited. Raw sensing data can be recorded using movement sensors that are utilized in the skill assessment component. The processor 220 may be a dedicated processor for performing skill assessment and may include the sensors(s) 210. FIG. 5 shows an example of a skill trend recorded over time and showing an improvement in a walking skill over a number of weeks.

The approach of the embodiment was tested using a standard dataset (Casale, P., Pujol, O., and Radeva, P. (2012), "Personalization and user verification in wearable systems using biometric walking patterns", Personal and Ubiquitous Computing, 16(5), 563-580) containing activities of daily living. In this data set, a chest mounted accelerometer was used to capture movement data for automatically identifying seven different types of activities including walking, standing, going upstairs, etc. The method illustrated in FIG. 1 was used for assessing the skill involved in such movements.

As per FIG. 1, the raw data was initially segmented into adjacent windows (overlapping sliding windows). This is followed by low-level feature extraction for every window. The following features were computed in this exercise:

99 FFTs in total (33 per axis)
20 ECDFs for all axes (19+1 mean in total)
1 Energy on magnitude
1 Entropy on magnitude
3 mean per axis
3 std per axis
3 correlation coefficients These are a standard set of features utilized in Human Activity Recognition (HAR) applications resulting in a total of 130 features. These features are then used to automatically classify activities.

In this example, activities are classified using a k-NN Classifier for varying levels of noise, simulating skill change. The upper graph in FIG. 6 shows the resulting plot of average classification F1-score of the walking activity with respect to changing noise levels. It can be seen that as noise is reduced, the classifier performance increases. A similar trend is also seen in the average posterior probability of prediction (see the lower line of FIG. 6). This is significant as the classifier is still able to perform better than baseline chance, i.e., it can recognize the walking activity even at 50% noise level. Posterior probabilities can therefore be used to classify skill. In this simulated example, correlation between noise levels and posterior probabilities indicate the learning component required for skill assessment. The correlation between average F1-score and average posterior probability shows that representations in posterior probabilities can be utilised for skill assessment. This allows the use of the above described "flat" skill assessment model in which a low-level activity classification is only followed by a second classification step in which the skill level is classified. This flat skill assessment model differs from known hierarchical skill assessment models in complexity and the number of decision layers.

FIG. 7 shows similar results generated using a skill classification method of an embodiment that relies on a decision tree classifier. The upper graph of FIG. 7 again shows the resulting plot of average classification F1-score of the walking activity; the bottom graph of FIG. 7 shows the average posterior probability of prediction. FIG. 7 proves that the method of the embodiment is classifier independent. In one embodiment a SVM classifier is used alongside the resultant posterior probabilities for skill assessment of complex movements.

Whilst certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method of skill classification comprising:
repeatedly receiving, by communication circuitry, data indicative of an activity performed by a person and repeatedly detected by a sensor, the activity including a physical movement of at least one part of a body of the person;
classifying, by a computer, a type of the activity performed by the person in accordance with a range of physical movements of at least one part of the body of the person by using the received data repeatedly to provide both an indication of the type of the activity and a confidence score representing a confidence that the activity has been classified correctly, the confidence score being determined based on a classification step, wherein:
a first type of the activity is classified by a first number of physical movements of at least one part of the body;
a second type of the activity is classified by a second number of physical movements of at least one part of the body;
the second number is less than the first number; and
the first type of the activity is different from the second type of the activity;
extracting, by the computer, features of a time series of the provided confidence scores;
classifying, by the computer, a skill level of the type of the activity of the person on the basis of the features, wherein the classifying comprises using a k-NN classifier for varying levels of noise; and
determining that at less than or equal to 50% noise level, a class weighted F1-score of the k-NN classifier and average posterior probabilities of the k-NN classifier are greater than a chance baseline F1-score and a chance baseline average posterior probability, respectively.

2. A method as claimed in claim 1, wherein expert input is used for training a model used for classifying the skill level.

3. A device comprising:
reception circuitry configured repeatedly to receive data indicative of an activity performed by a person and repeatedly detected by a sensor, the activity including a physical movement of at least one part of a body of the person; and
processing circuitry configured to:
classify a type of the activity performed by the person in accordance with a range of physical movements of at least one part of the body of the person by using the received data repeatedly to provide both an indication of the type of the activity and a confidence score representing a confidence that the activity has been classified correctly, the confidence score being determined based on a classification step, wherein:
a first type of the activity is classified by a first number of physical movements of at least one part of the body;
a second type of the activity is classified by a second number of physical movements of at least one part of the body;
the second number is less than the first number; and
the first type of the activity is different from the second type of the activity;
extract features of a time series of confidence scores;
classify a skill level of the type of the activity of the person on the basis of the features, wherein the classifying comprises using a k-NN classifier for varying levels of noise; and
determine that at less than or equal to 50% noise level, a class weighted F1-score of the k-NN classifier and average posterior probabilities of the k-NN classifier are greater than a chance baseline F1-score and a chance baseline average posterior probability, respectively.

4. A device as claimed in claim 3, the processing circuitry further configured to extract features from the received data by using a sliding window or unsupervised symbolic classification of the received data to classify the type of the activity performed by the person based on the received data.

5. A device as claimed in claim 3, wherein expert input is used for training a model used for classifying the skill level.

6. A device as claimed in claim 3, wherein the device is a smart phone, a wearable smart wristband, a watch and/or is integrated in an item of clothing for wear.

7. A device as claimed in claim 3, the processing circuitry further configured to indicate a result of skill classification to a user.

8. A device as claimed in claim 3, the processing circuitry further configured to aggregate skill classifications and output an indication of change in the classified skill level.

9. A device as claimed in claim 3, wherein classifying the type of the activity performed by the person further comprises extracting the features from the received data by determining a mean of the received data in a sliding window.

10. A device as claimed in claim 3, wherein classifying the type of the activity performed by the person further comprises extracting the features from the received data by determining a root mean square of the received data in a sliding window.

11. A method of skill classification comprising:
repeatedly receiving, by a communication circuitry, data indicative of an activity performed by a person and repeatedly detected by a sensor, the activity including a physical movement of at least one part of a body of the person;
classifying, by a computer, a type of the activity performed by the person in accordance with a range of physical movements of at least one part of the body of the person by using the received data repeatedly to provide both an indication of the type of the activity and a confidence score representing a confidence that the activity has been classified correctly, the confidence score being determined based on a classification step, wherein classifying the type of the activity performed by the person comprises using an unsupervised symbolic classification and:
a first type of the activity is classified by a first number of physical movements of at least one part of the body;
a second type of the activity is classified by a second number of physical movements of at least one part of the body;
the second number is less than the first number; and
the first type of the activity is different from the second type of the activity;
extracting, by the computer, features of a time series of the provided confidence scores;
classifying, by the computer, a skill level of the type of the activity of the person on the basis of the features, wherein the classifying comprises using a k-NN classifier for varying levels of noise; and
determining that at less than or equal to 50% noise level, a class weighted F1-score of the k-NN classifier and average posterior probabilities of the k-NN classifier are greater than a chance baseline F1-score and a chance baseline average posterior probability, respectively.

12. A device comprising:
reception circuitry configured repeatedly to receive data indicative of an activity performed by a person and repeatedly detected by a sensor, the activity including a physical movement of at least one part of a body of the person; and
processing circuitry configured to:
classify a type of the activity performed by the person in accordance with a range of physical movements of at least one part of the body of the person by using the received data repeatedly to provide both an indication of the type of the activity and a confidence score representing a confidence that the activity has been classified correctly, the confidence score being determined based on a classification step, wherein classifying the type of the activity performed by the person comprises using an unsupervised symbolic classification and:
a first type of the activity is classified by a first number of physical movements of at least one part of the body;
a second type of the activity is classified by a second number of physical movements of at least one part of the body;
the second number is less than the first number; and
the first type of the activity is different from the second type of the activity;
extract features of a time series of the provided confidence score;
classify a skill level of the type of the activity of the person on the basis of the features, wherein the classifying comprises using a k-NN classifier for varying levels of noise; and
determine that at less than or equal to 50% noise level, a class weighted F1-score of the k-NN classifier and average posterior probabilities of the k-NN classifier are greater than a chance baseline F1-score and a chance baseline average posterior probability, respectively.

* * * * *